United States Patent
Stava et al.

(10) Patent No.: US 10,950,042 B2
(45) Date of Patent: Mar. 16, 2021

(54) GUIDED TRAVERSAL IN COMPRESSION OF TRIANGULAR MESHES

(71) Applicant: Google Inc., Mountain View, CA (US)

(72) Inventors: Ondrej Stava, San Jose, CA (US); Michael Hemmer, San Francisco, CA (US)

(73) Assignee: Google LLC, Mountain View, CA (US)

( * ) Notice: Subject to any disclaimer, the term of this patent is extended or adjusted under 35 U.S.C. 154(b) by 66 days.

(21) Appl. No.: 15/612,736

(22) Filed: Jun. 2, 2017

(65) Prior Publication Data

US 2018/0350138 A1     Dec. 6, 2018

(51) Int. Cl.
| G06T 17/00 | (2006.01) |
| G06T 17/20 | (2006.01) |
| G06T 9/00 | (2006.01) |
| A63F 13/52 | (2014.01) |
| G06T 15/00 | (2011.01) |

(52) U.S. Cl.
CPC .............. *G06T 17/20* (2013.01); *A63F 13/52* (2014.09); *G06T 9/00* (2013.01); *G06T 15/005* (2013.01); *A63F 2300/66* (2013.01); *G06T 2200/04* (2013.01)

(58) Field of Classification Search
CPC ......... G06T 17/20; G06T 15/005; A63F 13/52
USPC ................................ 345/418, 419, 420, 423
See application file for complete search history.

(56) References Cited

U.S. PATENT DOCUMENTS

| 6,088,035 A | 7/2000 | Sudarsky et al. |
| 6,167,159 A | 12/2000 | Touma et al. |
| 6,204,854 B1 | 3/2001 | Signes et al. |

(Continued)

FOREIGN PATENT DOCUMENTS

| CN | 102467753 B | 10/2013 |
| CN | 102682103 B | 3/2014 |

(Continued)

OTHER PUBLICATIONS

Mitra, T. and Chiueh, T.C., Aug. 1998, "A Breadth-First Approach to Efficient Mesh Traversal", in Proceedings of the ACM Siggraph/Eurographics workshop on Graphics hardware (pp. 31-38). ACM.*

(Continued)

*Primary Examiner* — Sarah Lhymn
(74) *Attorney, Agent, or Firm* — Brake Hughes Bellermann LLP

(57) ABSTRACT

Techniques of compressing triangular mesh data involve encoding a bitstream that defines a traversal order for vertices in a triangular mesh. The encoded bitstream defining the traversal order is in addition to an encoded bitstream of prediction errors and is an explicit, rather than implicit, traversal. One example of a bitstream that defines a traversal order is an array in which a bit signifies whether a step in an implicit, deterministic scheme such as a depth-first traversal. Upon decoding, the usual deterministic steps are used to find the vertices of the triangular mesh unless specified by the traversal bitstream. Such an encoded bitstream, when occupying less memory than that saved from the compression efficiencies gained in defining the traversal order defined in the bitstream, offers a simple, efficient compression without requiring that the triangular mesh be connected.

9 Claims, 8 Drawing Sheets

(56) References Cited

U.S. PATENT DOCUMENTS

| | | | |
|---|---|---|---|
| 6,262,737 B1* | 7/2001 | Li | G06T 17/20 345/419 |
| 6,525,722 B1 | 2/2003 | Deering et al. | |
| 6,532,012 B2 | 3/2003 | Deering et al. | |
| 6,563,500 B1 | 5/2003 | Seo et al. | |
| 6,879,324 B1 | 4/2005 | Hoppe et al. | |
| 7,103,211 B1 | 9/2006 | Medioni et al. | |
| 7,280,109 B2 | 10/2007 | Hoppe et al. | |
| 7,283,134 B2 | 10/2007 | Hoppe et al. | |
| 7,804,498 B1 | 9/2010 | Graham et al. | |
| 8,022,951 B2 | 9/2011 | Zhirkov et al. | |
| 8,217,941 B2 | 7/2012 | Park et al. | |
| 8,390,622 B2 | 3/2013 | Park et al. | |
| 8,619,085 B2 | 12/2013 | Keall et al. | |
| 8,660,376 B2 | 2/2014 | Ahn et al. | |
| 8,736,603 B2 | 5/2014 | Curington et al. | |
| 8,805,097 B2 | 8/2014 | Lee et al. | |
| 8,811,758 B2 | 8/2014 | Leed et al. | |
| 8,884,953 B2 | 11/2014 | Teng et al. | |
| 8,949,092 B2 | 2/2015 | Chen et al. | |
| 9,064,311 B2 | 6/2015 | Mammou et al. | |
| 9,111,333 B2 | 8/2015 | Jiang | |
| 9,171,383 B2 | 10/2015 | Lee et al. | |
| 9,348,860 B2 | 5/2016 | Cai et al. | |
| 9,396,512 B2 | 7/2016 | Karras | |
| 9,424,663 B2 | 8/2016 | Ahn et al. | |
| 2004/0208382 A1 | 10/2004 | Gioia et al. | |
| 2010/0086050 A1* | 4/2010 | Badawy | G06T 9/001 375/240.16 |
| 2011/0010400 A1 | 1/2011 | Hayes et al. | |
| 2012/0306875 A1 | 12/2012 | Cai et al. | |
| 2014/0168360 A1 | 6/2014 | Ahn et al. | |
| 2014/0198182 A1* | 7/2014 | Ward | H04N 19/597 348/43 |
| 2014/0303944 A1 | 10/2014 | Jiang et al. | |
| 2014/0376827 A1* | 12/2014 | Jiang | G06T 9/001 382/238 |
| 2016/0086353 A1 | 3/2016 | Zalik et al. | |

FOREIGN PATENT DOCUMENTS

| | | |
|---|---|---|
| KR | 1019990085657 A | 12/1999 |
| KR | 1020010008944 A | 2/2001 |
| KR | 1020030071019 A | 9/2003 |
| KR | 100420006 B1 | 2/2004 |
| KR | 1020040096209 A | 11/2004 |
| KR | 1020050006322 A | 1/2005 |
| KR | 1020050006323 A | 1/2005 |
| KR | 1020060087631 A | 8/2006 |
| KR | 1020060087647 A | 8/2006 |
| KR | 1020060087662 A | 8/2006 |
| KR | 1020060088136 A | 8/2006 |
| KR | 1020080066216 A | 7/2008 |
| KR | 1020090025672 A | 3/2009 |
| KR | 1020090097057 A | 9/2009 |
| KR | 100927601 B1 | 11/2009 |
| KR | 1020100007685 A | 1/2010 |
| KR | 20100012724 A | 2/2010 |
| KR | 20100112848 A | 10/2010 |
| WO | 0045237 A2 | 8/2000 |
| WO | 2010111097 A1 | 9/2010 |

OTHER PUBLICATIONS

Kronrod, B. and Gotsman, C., 2002. "Optimized Compression of Triangle Mesh Geometry Using Prediction Trees.", in 3D Data Processing Visualization and Transmission, 2002. Proceedings. First International Symposium on (pp. 602-608). IEEE.*

Isenburg, Martin, and Pierre Alliez. "Compressing polygon mesh geometry with parallelogram prediction." in Proceedings of the conference on Visualization'02, pp. 141-146. IEEE Computer Society, 2002.*

Peng, J., Kim, C. S., & Kuo, C. C. J. (2005). Technologies for 3D mesh compression: A survey. Journal of Visual Communication and Image Representation, 16(6), 688-733.*

"A Rational Parameterization of the Unit Circle", Leaves of Math, retrieved on Aug. 26, 2016 from https://mathnow.wordpress.com/2009/11/06/a-rational-Parameterization-of-the-Unit-Circle/, Nov. 6, 2009, 4 pages.

"Entropy encoding", Wikipedia, the free encyclopedia, retrieved from https://en.wikipedia.org/wiki/Entropy_encoding, Apr. 11, 2016, 1 page.

"Quantization", Wikipedia, the free encyclopedia, retrieved from https://en.wikipedia.org/wiki/Quantization, Apr. 11, 2016, 1 page.

Alliez, et al., "Progressive compression for lossless transmission of triangle meshes", Proceedings of the 28th annual conference on Computer graphics and interactive techniques, 2001, 8 pages.

Gandoin, et al., "Progressive lossless compression of arbitrary simplicial complexes", ACM Transactions on Graphics (TOG), Jul. 23, 2002, 20 pages.

Gumhold, et al., "Predictive point-cloud compression", ACM Siggraph 2005 Sketches, Jul. 31, 2005, 1 page.

Huang, et al., "Octree-Based Progressive Geometry Coding of Point Clouds", SPBG Jul. 29, 2006: 103110., Jul. 29, 2006, 9 pages.

Isenburg, "Compression and Streaming of Polygon Meshes", dissertation, retrieved from http://cs.unc.edu/newspublications/doctoral-dissertations/abstracts-a-l/#Isenburg, 2005, 217 pages.

Merry, et al., "Compression of dense and regular point clouds", Computer Graphics Forum, Dec. 1, 2006, 7 pages.

Narkowicz, "Octahedron normal vector encoding", retrieved on Aug. 26, 2016 from https://knarkowicz.wordpress.com/2014/04/16/octahedron-normal-vector-encoding/, Apr. 16, 2014, 9 pages.

Rossignac, Jarek , et al., "Edgebreaker on a Corner Table: A Simple Technique for Representing and Compressing Triangulated Surfaces", Hierarchical and Geometrical Methods in Scientific Visualization. Mathematics and Visualization. Springer, Berlin, Heidelberg, 2003, 10 pages.

Schnabel, Ruwen , "Octree-based Point-Cloud Compression", Eurographics Symposium on Point-Based Graphics, 2006, 11 pages.

Waschbüsch, et al., "Progressive compression of point-sampled models", Eurographics symposium on point-based graphics, Jun. 2, 2004, 9 pages.

Bavoli, "Compression of Triangle Meshes", retrieved on Jul. 20, 2018 from: https://pdfs.semanticscholar.org/presentation/0d88/c21fe33c0bd1ca20f510b1d926793 16c8ac0.pdf, XP002783206, Jan. 17, 2006, 41 pages.

Extended European Search Report for European Application No. 18175671.9, dated Jul. 30, 2018, 8 pages.

International Search Report and Written Opinion for PCT Application No. PCT/US2018/035077, dated Aug. 6, 2018, 15 pages.

Rossignac, "Edgebreaker: Connectivity Compression for Triangle Meshes", IEEE Transactions on Visualization and Computer Graphics, vol. 5, No. 1, XP000832555, Jan.-Mar. 1999, pp. 47-61.

* cited by examiner

[0 1 1 1 1 1 1 1 1 1 1 1 1 1]

|  | Spanning Tree Method | | Greedy Method | |
| --- | --- | --- | --- | --- |
|  | Compression gain (without traversal encoding) | Compression gain (with traversal encoding) | Compression gain (without traversal encoding) | Compression gain (with traversal encoding) |
| Bunny | 13% | 5% | 13% | 7% |
| Vase | 12% | 4% | 12% | 3% |
| City | 9% | 1% | 5% | 0.5% |

FIG. 7

GUIDED TRAVERSAL IN COMPRESSION OF TRIANGULAR MESHES

TECHNICAL FIELD

This description relates to compression of three-dimensional object data.

BACKGROUND

Some applications such as video games involve representing three-dimensional objects to a user. In one example, an adventure game played by a user in a virtual reality environment may require the generation of virtual trees, rocks, and people. In another example, a mapping application may require the representation of buildings. In some applications, each such object includes a triangular mesh having a plurality of vertices, i.e., points in space that form triangles. Such a triangular mesh involves a plethora of data that may be stored on disk and transmitted to the user. Practical implementations of storing and transmitting the triangular mesh data representing a virtual object include compressing the triangular mesh data.

SUMMARY

In one general aspect, a method can include receiving, by processing circuitry of a computer configured to represent information related to a three-dimensional object, a plurality of vertices of a triangular mesh representing the three-dimensional object, the triangular mesh including a plurality of faces, each if the plurality of faces including three vertices of the plurality of vertices. The method can also include generating, by the processing circuitry, a first bitstream representing a traversal order for the plurality of vertices. The method can further include generating, by the processing circuitry, a second bitstream representing an array of errors between predicted vertices and vertices of the plurality of vertices. The method can further include performing, by the processing circuitry, a first compression operation on the first bit stream to produce a first compressed bitstream. The method can further include performing, by the processing circuitry, a second compression operation on the second bit stream to produce a second compressed bitstream, the first compressed bitstream and the second compressed bitstream producing the plurality of vertices of the triangular mesh in response to a decompression operation.

The details of one or more implementations are set forth in the accompanying drawings and the description below. Other features will be apparent from the description and drawings, and from the claims.

BRIEF DESCRIPTION OF THE DRAWINGS

FIG. 7 is a table that illustrates example results of encoding various objects using the guided traversals illustrated in FIGS. 5A and 6.

DETAILED DESCRIPTION

A conventional approach to compressing triangular mesh data involves generating a traversal order for the vertices of the triangular mesh according to a deterministic formula. For example, a traversal order generated by the Edgebreaker algorithm begins at a specified face of the triangular mesh and proceeds to adjacent faces to the right if possible.

In the above-described conventional approach to compressing triangular mesh data, the deterministic formula used to generate the traversal order for the vertices of the triangular mesh is arbitrary and is not optimal with respect to prediction errors that result from the traversal. Such prediction errors may be seen with respect to a parallelogram prediction; in this case, when traversal to any of several triangular faces is possible, there is no mechanism for the deterministic formula to produce as the next face that which would minimize the parallelogram prediction error. Larger prediction errors produce a larger entropy of the triangular mesh data to be compressed, which in turns results in a less efficient compression scheme.

In accordance with the implementations described herein, improved techniques of compressing triangular mesh data involve encoding a bitstream that defines a traversal order for vertices in a triangular mesh. The encoded bitstream defining the traversal order is in addition to an encoded bitstream of prediction errors and is an explicit, rather than implicit, traversal. One example of a bitstream that defines a traversal order is an array in which a bit signifies whether a step in an implicit, deterministic scheme such as a depth-first traversal. Upon decoding, the usual deterministic steps are used to find the vertices of the triangular mesh unless specified by the traversal bitstream. Such an encoded bitstream, when occupying less memory than that saved from the compression efficiencies gained in defining the traversal order defined in the bitstream, offers a simple, efficient compression.

Figure 1:
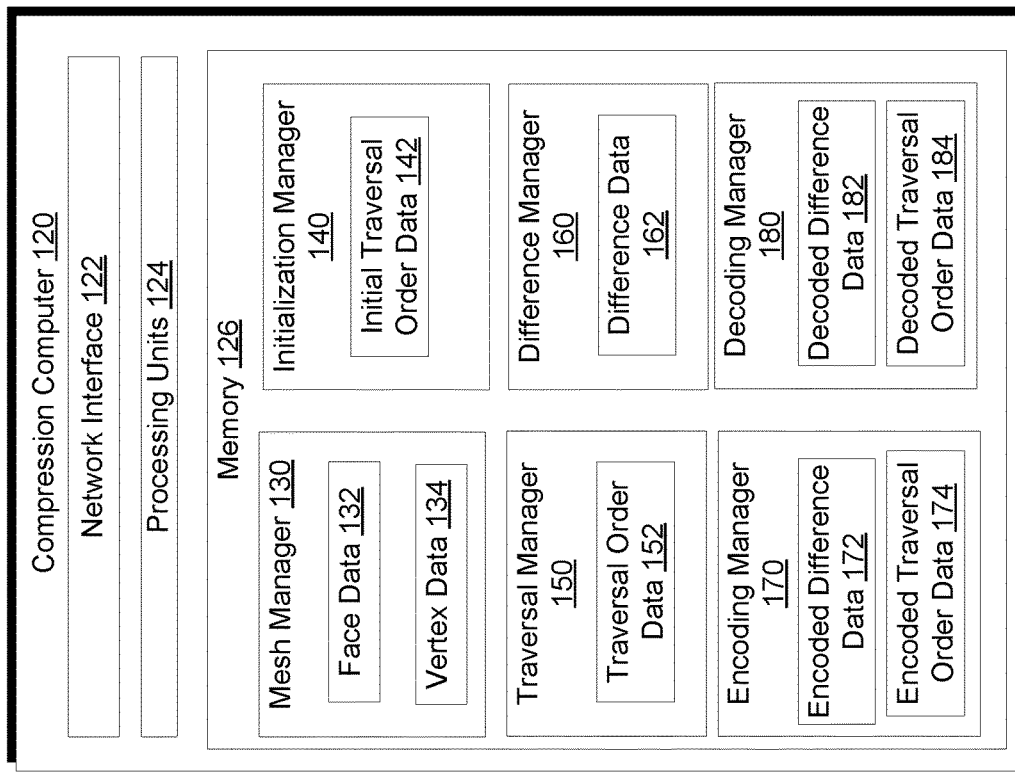
FIG. 1 is a diagram that illustrates an example electronic environment for implementing improved techniques described herein.

FIG. 1 is a diagram that illustrates an example electronic environment 100 in which the above-described improved techniques may be implemented. As shown, in FIG. 1, the example electronic environment 100 includes a compression computer 120.

The compression computer 120 is configured to compress data associated with a triangular mesh representing a three-dimensional object. The compression computer 120 includes a network interface 122, one or more processing units 124, and memory 126. The network interface 122 includes, for example, Ethernet adaptors, Token Ring adaptors, and the like, for converting electronic and/or optical signals received from the network 170 to electronic form for use by the point cloud compression computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the compression computer 120 can be, or can include processors (e.g., processing units 124) configured to process instructions stored in the memory 126. Examples of such instructions as depicted in FIG. 1 include a mesh manager 130, an initialization manager 140, a traversal manager 150, a difference manager 160, an encoding manager 170, and a decoding manager 180. Further, as illustrated in FIG. 1, the memory 126 is configured to store various data, which is described with respect to the respective managers that use such data.

The mesh manager 130 is configured to receive, store, and/or transmit triangular mesh data, including face data 132 and vertex data 134. Each of the vertices of the vertex data 134 includes an ordered triplet representing a point in space. In some implementations, the vertex data 134 includes as the ordered triplet indices which point to the point in space. In some implementations, each component of the ordered triplet is quantized, i.e., represented by a bit string of a specified length. In some implementations, the vertex data 134 also includes a vertex identifier for each vertex. In some implementations, the face data 132 includes a face identifier of a triangular face and the vertex identifiers of the three vertices that make up the triangular face. In some implementations, the mesh manager 130 is configured to receive the triangular mesh data from an external source over a network (not shown).

The initialization manager 140 is configured to generate an initial traversal order 142 from which a deviation from that order may be derived. In some implementations, the initial traversal order 142 is an implicit, deterministic order such as a depth-first traversal order. In some implementations, the initial traversal order 142 is an implicit, deterministic order such as a breadth-first traversal order.

The traversal manager 150 is configured to generate a traversal order 152 in which the vertices 134 are arranged for purposes of compressing the prediction error between a vertex and one predicted from consideration of its neighbors. Along these lines, the traversal manager 150 is configured to generate, as the traversal order 152, a deviation from the initial traversal order 142 when the traversal manager 150 determines that the prediction error from a current triangular face is larger than that from another triangular face. It is the traversal order 152 and not the initial traversal order 142 that is encoded by the encoding manager 170.

The difference manager 160 is configured to produce difference data 162 between a point predicted by the vertices of a triangular face 132 of the triangular mesh and a neighboring vertex that is next according to the traversal order 152. In some implementations, the difference data 162 includes a triplet of bit strings of some length specified by a quantization procedure.

The encoding manager 170 is configured to encode the difference data 162 to produce encoded difference data 172. In some arrangements, the encoding manager 170 uses an entropy encoder such as, e.g., arithmetic coding or Huffman coding to perform the encoding of the difference data 162. Ideally, there is as little variation in the difference data 162 as possible so that the encoded difference data 172 has small entropy.

The decoding manager 180 is configured to decode the encoded difference data 172 to produce decoded difference data 182. Given the decoded difference data 182 and the predictions made by each respective triangular face 132 in the triangular mesh, each of the vertices 134 of the triangular mesh may be deduced.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the compression computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the compression computer 120.

The components (e.g., modules, processing units 124) of the compression computer 120 can be configured to operate based on one or more platforms (e.g., one or more similar or different platforms) that can include one or more types of hardware, software, firmware, operating systems, runtime libraries, and/or so forth. In some implementations, the components of the compression computer 120 can be configured to operate within a cluster of devices (e.g., a server farm). In such an implementation, the functionality and processing of the components of the compression computer 120 can be distributed to several devices of the cluster of devices.

The components of the compression computer 120 can be, or can include, any type of hardware and/or software configured to process attributes. In some implementations, one or more portions of the components shown in the components of the compression computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the compression computer 120 can be, or can include, a software module configured for execution by at least one processor (not shown). In some implementations, the functionality of the components can be included in different modules and/or different components than those shown in FIG. 1.

Although not shown, in some implementations, the components of the compression computer 120 (or portions thereof) can be configured to operate within, for example, a data center (e.g., a cloud computing environment), a computer system, one or more server/host devices, and/or so forth. In some implementations, the components of the compression computer 120 (or portions thereof) can be configured to operate within a network. Thus, the components of the compression computer 120 (or portions thereof) can be configured to function within various types of network environments that can include one or more devices and/or one or more server devices. For example, a network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the compression computer 120 can be, or can include, processors configured to process instructions stored in a memory. For example, the mesh manager 130 (and/or a portion thereof), the initialization manager 140 (and/or a portion thereof), the traversal manager 150 (and/or a portion thereof), the difference manager 160 (and/or a portion thereof), the encoding manager 170 (and/or a portion thereof), and the decoding manager 180 (and/or a portion thereof) can be a combination of a processor and a memory configured to execute instructions related to a process to implement one or more functions.

Figure 2:
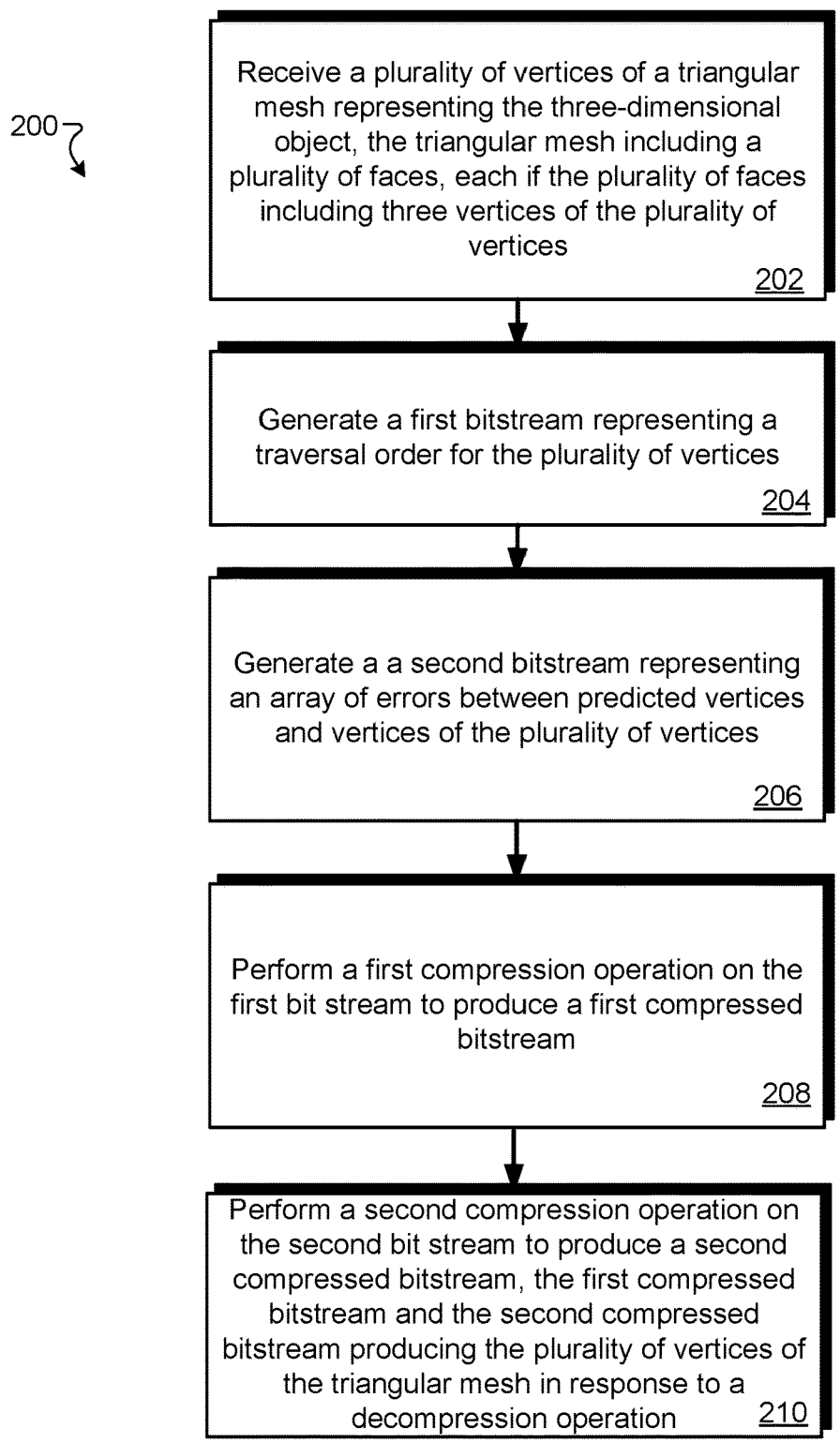
FIG. 2 is a diagram that illustrates an example method of performing the improved techniques within the electronic environment shown in FIG. 1.

FIG. 2 is a flow chart depicting an example method 200 of compressing triangular mesh data. The method 200 may be performed by software constructs described in connection with FIG. 1, which reside in memory 126 of the user device computer 120 and are run by the set of processing units 124.

At 202, the compression computer 120 (FIG. 1) receives a plurality of vertices of a triangular mesh representing the three-dimensional object. The triangular mesh includes a plurality of faces, each of the plurality of faces including three vertices of the plurality of vertices.

At 204, the compression computer 120 generates a first bitstream representing a traversal order for the plurality of vertices. In some implementations, the traversal order is expressed as a deviation from an implicit, deterministic traversal order.

At 206, the compression computer 120 generates a second bitstream representing an array of errors between predicted vertices and vertices of the plurality of vertices.

At 208, the compression computer 120 performs a first compression (i.e., encoding) operation on the first bit stream to produce a first compressed bitstream.

At 210, the compression computer 120 performs a second compression operation on the second bit stream to produce a second compressed bitstream. The first compressed bitstream and the second compressed bitstream produce the plurality of vertices of the triangular mesh in response to a decompression operation.

Figure 3:
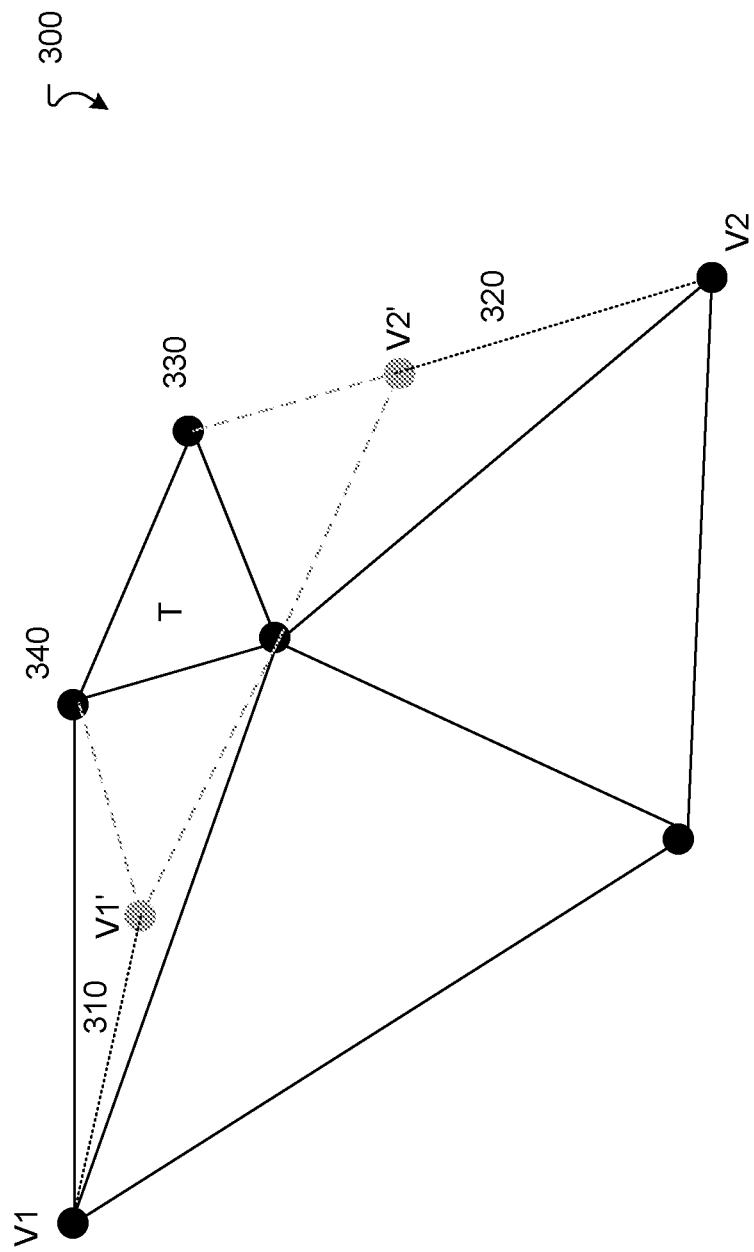
FIG. 3 is a diagram that illustrates example generation of prediction error in a triangular mesh within the electronic environment shown in FIG. 1.

FIG. 3 is a diagram illustrating an example triangular mesh 300 and an example generation of prediction error. In this example, the triangle labeled "T" is taken to be the current triangular face for the purpose of generating a traversal order. One of the points of the triangle was a previous neighboring vertex to a previous triangular face.

In generating the traversal order, one wishes to minimize the prediction error from neighboring vertices, in this case labeled "V1" and "V2." In some implementations, a predicted vertex position is generated using a parallelogram prediction method as illustrated in FIG. 3. In the parallelogram prediction method, a parallelogram is formed from the triangle T. The vertex furthest from the triangle T would then be the prediction point for a neighboring vertex of the triangular mesh.

As shown in FIG. 3, there are two neighboring vertices, and hence two possible traversal steps that may be selected as the next traversal step. In one example, a parallelogram is formed by a predicted vertex V1' opposite the vertex 330. V1' is the predicted vertex to be compared with the vertex V1. The error vector 310 is the difference between V1 and V1'. In another example, a parallelogram is formed by a predicted vertex V2' opposite the vertex 340. V2' is the predicted vertex to be compared with the vertex V2. The error vector 320 is the difference between V2 and V2'.

In some implementations, the predicted vertex may be derived using an alternative method. For example, predicted vertex V1' may be derived by mirroring the vertex 330 across the side opposite the vertex 330.

It turns out, nevertheless, that selecting a traversal order based directly on minimal prediction error is too computationally demanding for compression. Rather, the approach taken herein involves defining an explicit, or guided, traversal that does not rely on the connectivity of the mesh. This approach is disclosed in FIGS. 4-6.

Figure 4:
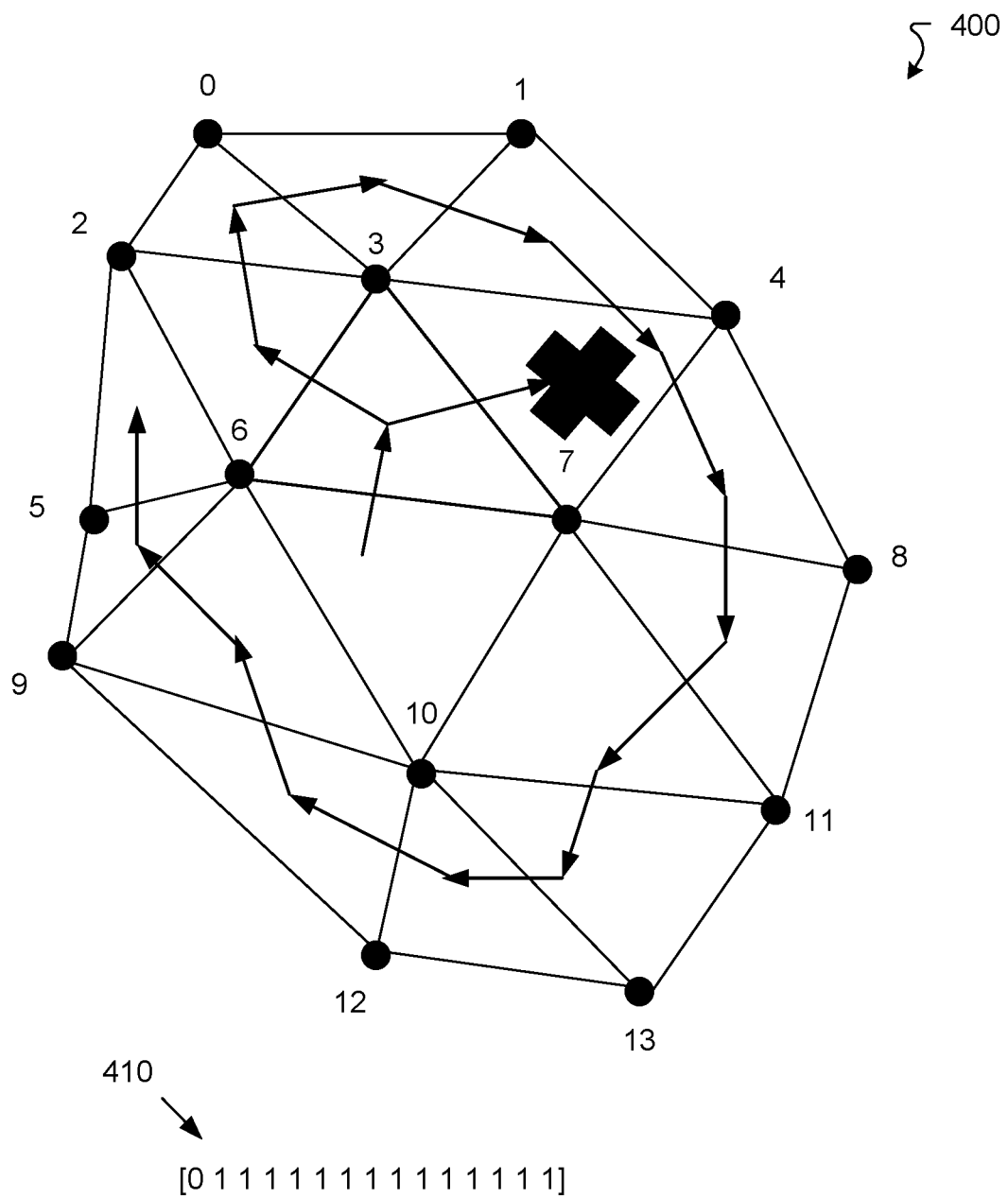
FIG. 4 is a diagram that illustrates an example encoding of a guided traversal within the electronic environment shown in FIG. 1.

FIG. 4 is a diagram illustrating an example triangular mesh with vertex identifiers at each vertex. The mesh includes interior vertices (e.g., vertices with indices 3, 6, 7, 10) and corner vertices (e.g., vertices with indices 0, 1, 2, 4, 5, 8, 9, 11, 12, 13).

The approach defined herein according to the above-described improved techniques begins by selecting an initial triangular face. In FIG. 3, that face is defined by the vertices with indices 3, 6, and 7 and is bolded. The next traversal step is one of the neighboring vertices (i.e., vertices with indices 2, 4, 10). However, when the traversal manager 150 determines that the prediction error from the current triangular face (e.g., based on the parallelogram prediction shown in FIG. 3) is larger than that from another triangular face, as in this case, the traversal manager 150 indicates that the traversal order will deviate from an initial traversal 142, in this case, the depth-first, deterministic traversal order.

Such an indication is illustrated in FIG. 4 by a large "X" at the tip of the arrow that represents the first step in the initial traversal 142. Further, the traversal manager 150 indicates this deviation with a "0" in the traversal order data 410. That is, when the traversal step is to the left rather than the right, the traversal order data 410 has a "0".

Further steps agree with the initial traversal order 142, and the traversal manager 150 indicates each agreement with a "1" in the traversal order data 410. In this case, when the traversal step is to the right, the traversal order has a "1". In this form, the traversal order 410 has very low entropy when there are mostly "1"s, which is the case with the traversal order 410.

When the expense of the additional encoded data resulting from compressing the traversal order data 410 is greater than the savings resulting from introducing smaller prediction errors in the difference data 162, then the traversal manager may cause the compression manager 170 to not encode the traversal order data 410 but rather revert to the implicit formulation instead. This is because there are roughly an equal number of "1"s and "0"s in the traversal order data 410 and therefore a relatively high entropy.

Figure 5A:
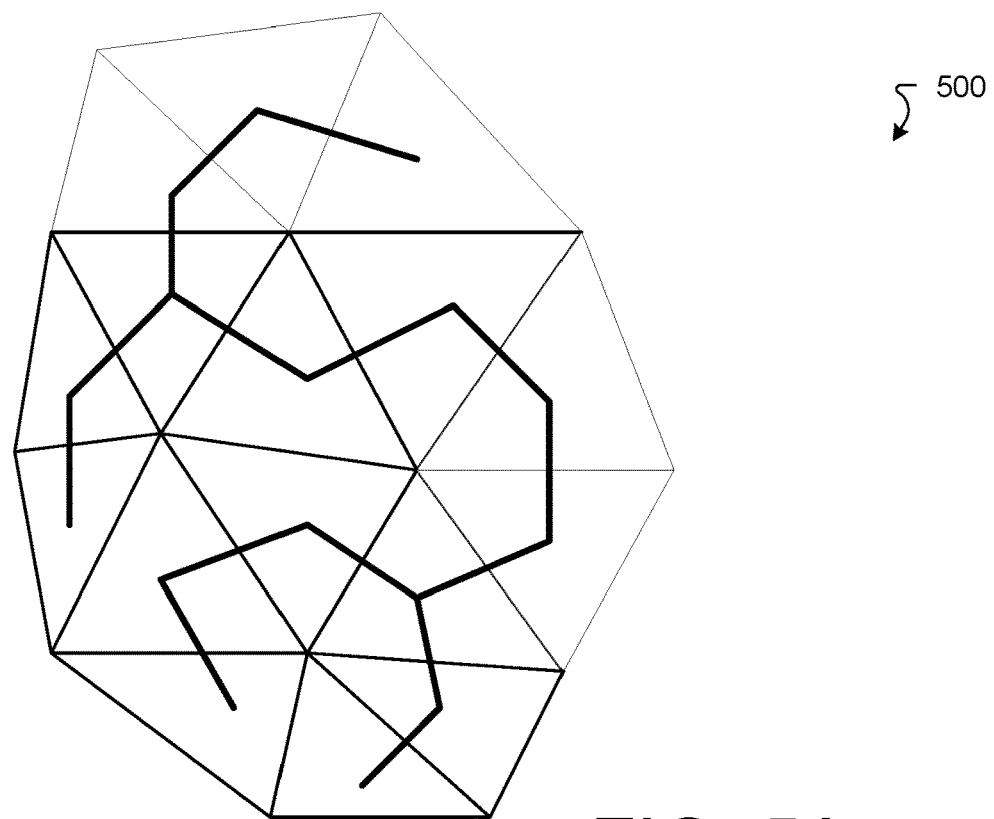
FIG. 5A is a diagram that illustrates an example generation of a guided traversal using a minimum spanning tree within the electronic environment shown in FIG. 1.

FIG. 5A is a diagram illustrating a triangular mesh 500 in which the traversal order data 152 is derived using a minimum spanning tree. In principle, one could imagine deriving the traversal order by maximizing the compression ratio of the difference data 162 plus the traversal order data 152. Nevertheless, it is reasonable to assume that such an optimization is an NP-hard problem so that approximate solutions like the minimum spanning tree are practical alternatives.

In the minimum spanning tree illustrated in FIG. 5A, each triangular face of the mesh 500 is a node of a graph and all neighboring faces are connected by a graph edge. The traversal manager 150 weights each edge by the prediction error at the end of an edge, i.e., in the face at which an edge terminates. The minimum spanning tree resulting from choosing the least of the prediction errors in choosing a branch of the spanning tree, while not producing the optimal overall prediction error, provides a small prediction error that can be close to the optimal. The runtime complexity of generating such a spanning tree is O(F log F), where F is the number of faces in the triangular mesh.

Figure 5B:
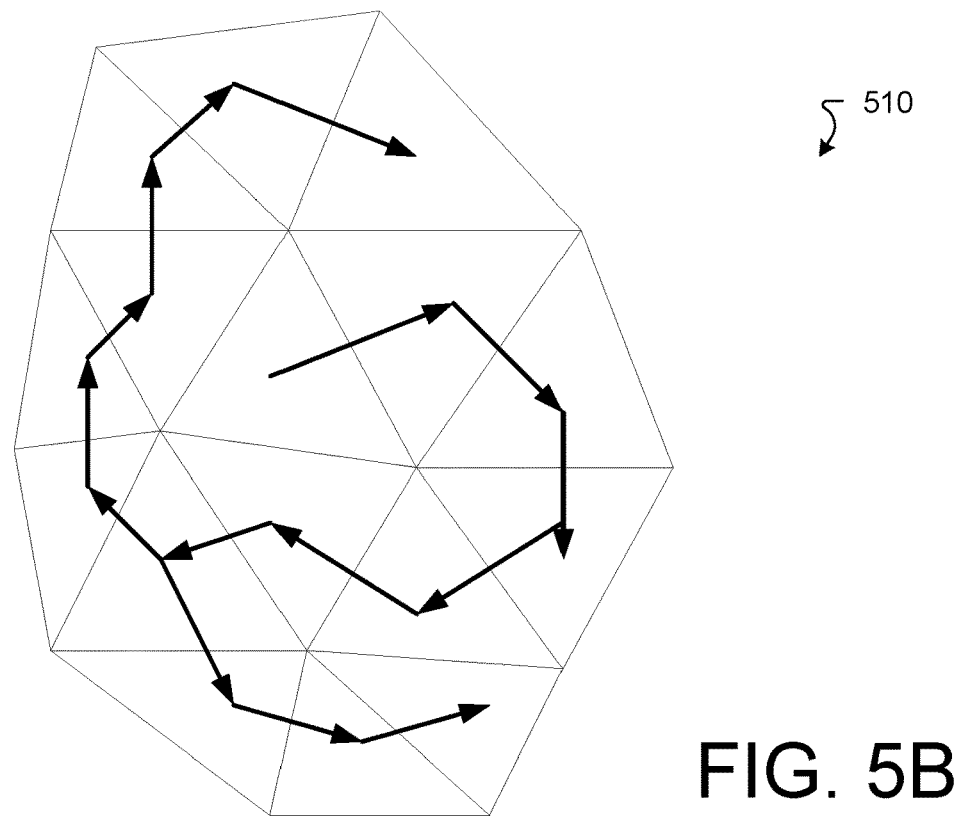
FIG. 5B is a diagram that illustrates an example generation of a depth-first traversal.

FIG. 5B is a diagram illustrating a depth-first implicit traversal of the triangular mesh 510. Accordingly, the traversal manager 150 may generate the traversal order data as a deviation of the minimum spanning tree illustrated in FIG. 5A from the traversal illustrated in FIG. 5B.

Figure 6:
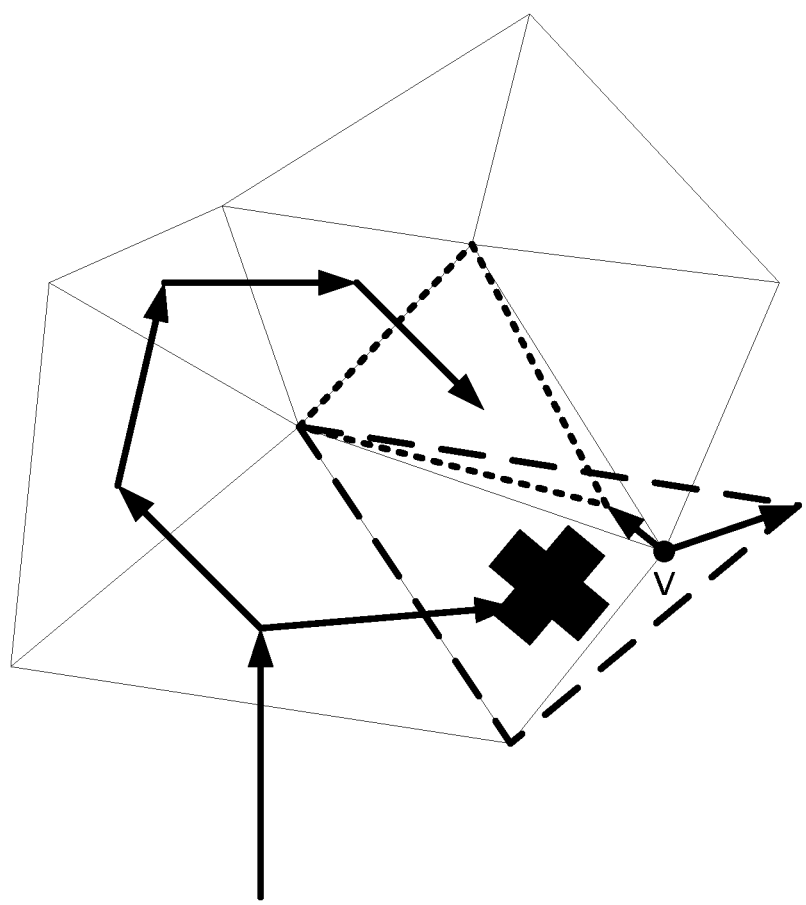
FIG. 6 is a diagram that illustrates an example generation of a guided traversal using a greedy algorithm within the electronic environment shown in FIG. 1.

FIG. 6 is a diagram illustrating a triangular mesh 600 in which a traversal order is generated using a greedy algorithm as an alternative to the minimum spanning tree shown in FIG. 5A. In the greedy algorithm, the traversal manager 150 always takes a given move, i.e., that provided by depth-first implicit traversal, unless the prediction error resulting from this move is much larger than that of the minimal prediction error available for a given vertex. The traversal manager 150 may control the deviation of the resulting traversal order 152 from the initial traversal order 142 by specifying the maximum allowed difference between the actual and minimal prediction error for a given vertex.

This traversal strategy is shown in FIG. 6. There, the initial prediction error is significantly larger than the prediction error from a different face of the triangular mesh. Accordingly, the step specified by the initial traversal 142 is not taken, and the resulting difference used will come later in the sequence specified by the traversal order 152.

FIG. 7 is a table illustrating some example compression gains resulting from applications of the traversal strategies described above. In general, traversal encoding as described herein provides at least about 1-6% compression gain in the examples shown.

Figure 8:
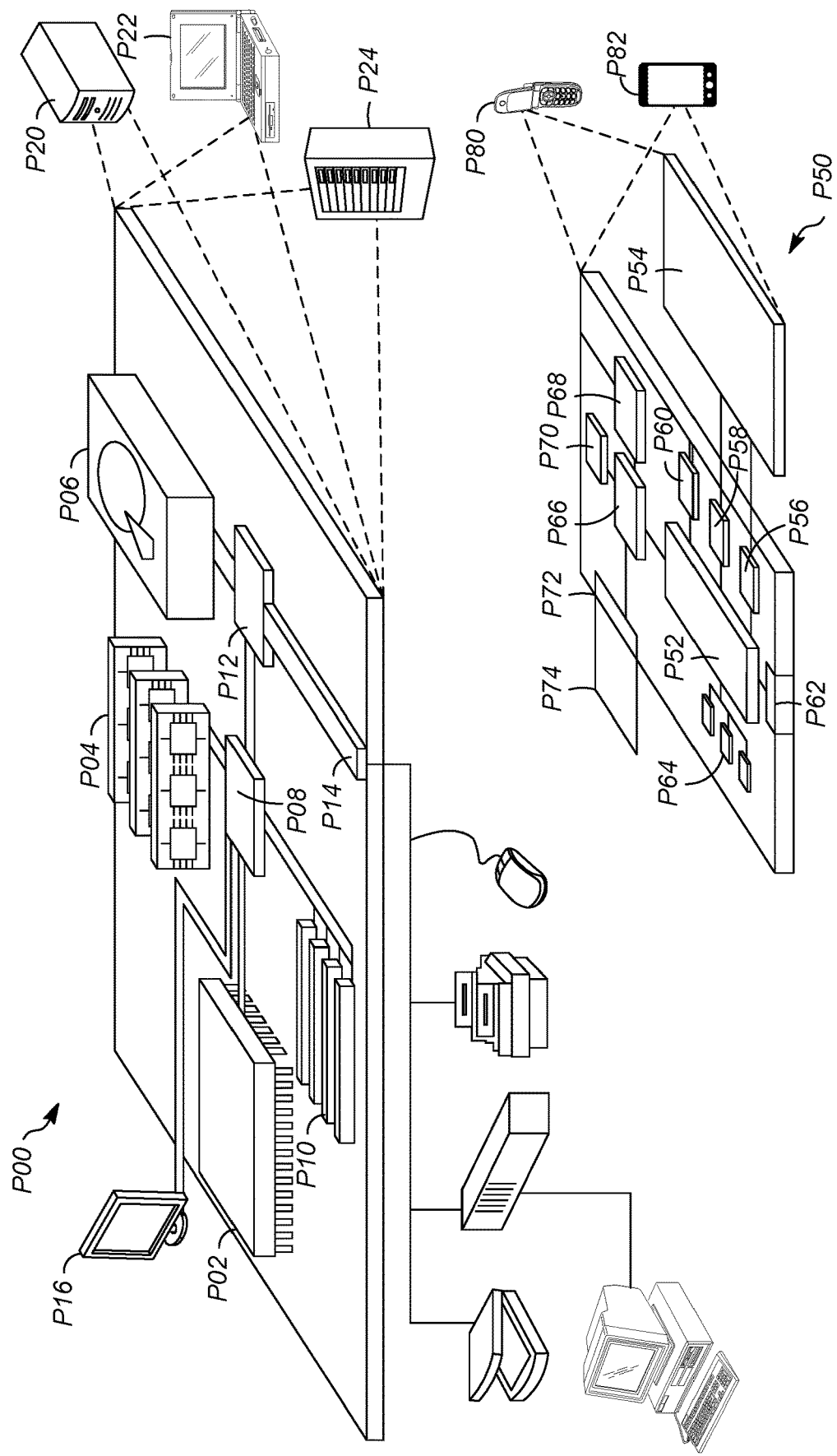
FIG. 8 illustrates an example of a computer device and a mobile computer device that can be used with circuits described here.

FIG. 8 illustrates an example of a generic computer device P00 and a generic mobile computer device P50, which may be used with the techniques described here.

Computing device P00 is intended to represent various forms of digital computers, such as laptops, desktops, tablets, workstations, personal digital assistants, televisions, servers, blade servers, mainframes, and other appropriate computing devices. Computing device P50 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device P00 includes a processor P02, memory P04, a storage device P06, a high-speed interface P08 connecting to memory P04 and high-speed expansion ports P10, and a low speed interface P12 connecting to low speed bus P14 and storage device P06. The processor P02 can be a semiconductor-based processor. The memory P04 can be a semiconductor-based memory. Each of the components P02, P04, P06, P08, P10, and P12, are interconnected using various busses, and may be mounted on a common motherboard or in other manners as appropriate. The processor P02 can process instructions for execution within the computing device P00, including instructions stored in the memory P04 or on the storage device P06 to display graphical information for a GUI on an external input/output device, such as display P16 coupled to high speed interface P08. In other implementations, multiple processors and/or multiple buses may be used, as appropriate, along with multiple memories and types of memory. Also, multiple computing devices P00 may be connected, with each device providing portions of the necessary operations (e.g., as a server bank, a group of blade servers, or a multi-processor system).

The memory P04 stores information within the computing device P00. In one implementation, the memory P04 is a volatile memory unit or units. In another implementation, the memory P04 is a non-volatile memory unit or units. The memory P04 may also be another form of computer-readable medium, such as a magnetic or optical disk.

The storage device P06 is capable of providing mass storage for the computing device P00. In one implementation, the storage device P06 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory P04, the storage device P06, or memory on processor P02.

The high speed controller P08 manages bandwidth-intensive operations for the computing device P00, while the low speed controller P12 manages lower bandwidth-intensive operations. Such allocation of functions is exemplary only. In one implementation, the high-speed controller P08 is coupled to memory P04, display P16 (e.g., through a graphics processor or accelerator), and to high-speed expansion ports P10, which may accept various expansion cards (not shown). In the implementation, low-speed controller P12 is coupled to storage device P06 and low-speed expansion port P14. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device P00 may be implemented in a number of different forms, as shown in the figure. For example, it may be implemented as a standard server P20, or multiple times in a group of such servers. It may also be implemented as part of a rack server system P24. In addition, it may be implemented in a personal computer such as a laptop computer P22. Alternatively, components from computing device P00 may be combined with other components in a mobile device (not shown), such as device P50. Each of such devices may contain one or more of computing device P00, P50, and an entire system may be made up of multiple computing devices P00, P50 communicating with each other.

Computing device P50 includes a processor P52, memory P64, an input/output device such as a display P54, a communication interface P66, and a transceiver P68, among other components. The device P50 may also be provided with a storage device, such as a microdrive or other device, to provide additional storage. Each of the components P50, P52, P64, P54, P66, and P68, are interconnected using various buses, and several of the components may be mounted on a common motherboard or in other manners as appropriate.

The processor P52 can execute instructions within the computing device P50, including instructions stored in the memory P64. The processor may be implemented as a chipset of chips that include separate and multiple analog and digital processors. The processor may provide, for example, for coordination of the other components of the device P50, such as control of user interfaces, applications run by device P50, and wireless communication by device P50.

Processor P52 may communicate with a user through control interface P58 and display interface P56 coupled to a display P54. The display P54 may be, for example, a TFT LCD (Thin-Film-Transistor Liquid Crystal Display) or an OLED (Organic Light Emitting Diode) display, or other appropriate display technology. The display interface P56 may comprise appropriate circuitry for driving the display P54 to present graphical and other information to a user. The control interface P58 may receive commands from a user and convert them for submission to the processor P52. In addition, an external interface P62 may be provided in communication with processor P52, so as to enable near area communication of device P50 with other devices. External interface P62 may provide, for example, for wired communication in some implementations, or for wireless communication in other implementations, and multiple interfaces may also be used.

The memory P64 stores information within the computing device P50. The memory P64 can be implemented as one or more of a computer-readable medium or media, a volatile memory unit or units, or a non-volatile memory unit or units. Expansion memory P74 may also be provided and connected to device P50 through expansion interface P72, which may include, for example, a SIMM (Single In Line Memory Module) card interface. Such expansion memory P74 may provide extra storage space for device P50, or may also store applications or other information for device P50. Specifically, expansion memory P74 may include instructions to carry out or supplement the processes described above, and may include secure information also. Thus, for example, expansion memory P74 may be provide as a security module for device P50, and may be programmed with instructions that permit secure use of device P50. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory P64, expansion memory P74, or memory on processor P52 that may be received, for example, over transceiver P68 or external interface P62.

Device P50 may communicate wirelessly through communication interface P66, which may include digital signal processing circuitry where necessary. Communication interface P66 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver P68. In addition, short-range communication may occur, such as using a Bluetooth, Wi-Fi, or other such transceiver (not shown). In addition, GPS (Global Positioning System) receiver module P70 may provide additional navigation- and location-related wireless data to device P50, which may be used as appropriate by applications running on device P50.

Device P50 may also communicate audibly using audio codec P60, which may receive spoken information from a user and convert it to usable digital information. Audio codec P60 may likewise generate audible sound for a user, such as through a speaker, e.g., in a handset of device P50. Such sound may include sound from voice telephone calls, may include recorded sound (e.g., voice messages, music files, etc.) and may also include sound generated by applications operating on device P50.

The computing device P50 may be implemented in a number of different forms, as shown in the figure. For example, it may be implemented as a cellular telephone P80. It may also be implemented as part of a smart phone P82, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
receiving, by processing circuitry of a computer configured to encode data associated with a three-dimensional object, vertex data representing a plurality of vertices of a triangular mesh, the triangular mesh representing the three-dimensional object and including a plurality of faces, each of the plurality of faces including three vertices of the plurality of vertices;
generating an initial traversal order specifying a sequence by which the plurality of faces are traversed according to an implicit, deterministic scheme, each step being one of a step to the left or a step to the right;
for a step of the sequence specified by the initial traversal order:
generating difference data representing (i) a first difference between a point predicted by the vertices of the face and a first vertex of the face, corresponding to a first step and (ii) a second difference between a point predicted by the vertices of the face and a second vertex of the face, corresponding to a second step, the first difference being smaller than the second difference; and
generating an indication in a traversal order of whether the first step deviates from the step of the sequence specified by the initial traversal order;
encoding, by the processing circuitry, the traversal order to produce an encoded bitstream; and
encoding, by the processing circuitry, the first difference to produce encoded difference data, the encoded difference data producing the plurality of vertices of the triangular mesh in response to decoding.

2. The method as in claim 1, wherein an element of the traversal order is a first bit value when a current traversal step is the same as a current step of the initial traversal order; and the element of the traversal order is a second bit value when the current traversal step is different than the current step of the initial traversal order, the second bit value being distinct from the first bit value.

3. The method as in claim 1, wherein the initial traversal order is based on a depth-first, implicit traversal through the plurality of faces;
wherein the predicted point is a parallelogram prediction of the first vertex.

4. A computer program product comprising a non-transitory storage medium, the computer program product including code that, when executed by processing circuitry of a user device configured to encode data associated with a three-dimensional object, a plurality of vertices of a triangular mesh representing the three-dimensional object, causes the processing circuitry to perform a method, the method comprising:
receiving the plurality of vertices of a triangular mesh representing the three-dimensional object, the triangular mesh including a plurality of faces, each of the plurality of faces including three vertices of the plurality of vertices;
generating an initial traversal order specifying a sequence by which the plurality of faces are traversed according to an implicit, deterministic scheme, each step being one of a step to the left or a step to the right;
for a step of the sequence specified by the initial traversal order:
generating difference data representing (i) a first difference between a point predicted by the vertices of the face and a first vertex of the face, corresponding to a first step and (ii) a second difference between a point predicted by the vertices of the face and a second vertex of the face, corresponding to a second step, the first difference being smaller than the second difference;
generating an indication in a traversal order of whether the first step deviates from the step of the sequence specified by the initial traversal order; and
encoding traversal order to produce an encoded bitstream; and
encoding first difference to produce encoded difference data, the encoded difference data producing the plurality of vertices of the triangular mesh in response to decoding.

5. The computer program product as in claim 4, wherein an element of the traversal order is a first bit value when a current traversal step is the same as a current step of the initial traversal order; and the element of the traversal order is a second bit value when the current traversal step is different than the current step of the initial traversal order, the second bit value being distinct from the first bit value.

6. The computer program product as in claim 4, wherein the initial traversal order is based on a depth-first, implicit traversal through the plurality of faces;
    wherein the predicted point is a parallelogram prediction of the first vertex.

7. An electronic apparatus configured to encode data associated with a three-dimensional object, a plurality of vertices of a triangular mesh representing the three-dimensional object, the electronic apparatus comprising:
    memory; and
    controlling circuitry coupled to the memory, the controlling circuitry being configured to:
    receive a plurality of vertices of a triangular mesh representing the three-dimensional object, the triangular mesh including a plurality of faces, each of the plurality of faces including three vertices of the plurality of vertices;
    generate an initial traversal order specifying a sequence by which the plurality of faces are traversed according to an implicit, deterministic scheme, each step being one of a step to the left or a step to the right;
    for a step of the sequence specified by the initial traversal order:
        generate difference data representing (i) a first difference between a point predicted by the vertices of the face and a first vertex of the face, corresponding to a first step and (ii) a second difference between a point predicted by the vertices of the face and a second vertex of the face, corresponding to a second step, the first difference being smaller than the second difference;
        generate an indication in a traversal order of whether the first step deviates from the step of the sequence specified by the initial traversal order;
        encoding traversal order to produce an encoded bitstream; and
        encoding first difference to produce encoded difference data, the encoded difference data producing the plurality of vertices of the triangular mesh in response to decoding.

8. The electronic apparatus as in claim 7, wherein an element of the traversal order is a first bit value when a current traversal step is the same as a current step of the initial traversal order; and the element of the traversal order is a second bit value when the current traversal step is different than the current step of the initial traversal order, the second bit value being distinct from the first bit value.

9. The electronic apparatus as in claim 7, wherein the initial traversal order is based on a depth-first, implicit traversal through the plurality of faces;
    wherein the predicted point is a parallelogram prediction of the first vertex.

\* \* \* \* \*